United States Patent [19]

Chasteen

[11] 4,188,237
[45] Feb. 12, 1980

[54] METHOD FOR CLEANING METAL PARTS WITH ELEMENTAL FLUORINE

[75] Inventor: Jack W. Chasteen, Kettering, Ohio

[73] Assignee: University of Dayton, Dayton, Ohio

[21] Appl. No.: 874,915

[22] Filed: Feb. 2, 1978

[51] Int. Cl.² ................................................ B08B 5/00
[52] U.S. Cl. ........................................ 134/2; 134/11; 134/19; 134/31; 134/37; 228/206
[58] Field of Search .................... 134/2, 11, 31, 37, 19; 228/206

[56] References Cited

U.S. PATENT DOCUMENTS

| | | | |
|---|---|---|---|
| 2,571,328 | 10/1951 | Baker et al. | 134/2 X |
| 2,585,819 | 2/1952 | Moore et al. | 228/206 |

OTHER PUBLICATIONS

Watson et al, "Decomposition Temperatures..." Bureau of Mines Report of Investigations 4756, U.S. Dept. of Interior, Dec. 1950.

"Brazing Stainless Steel in a Stable Reducing Atmosphere of Fluoride", AWS Meeting–Philadelphia, Apr. 1977.

Primary Examiner—Richard V. Fisher
Attorney, Agent, or Firm—Biebel, French & Nauman

[57] ABSTRACT

The method for cleaning damaged metal parts, particularly crack damaged gamma prime hardened nickel alloy parts, in order to render them repairable by brazing. The method makes use of elemental fluorine as the primary cleaning material. A reducing gas such as hydrogen may be present. The preferred source of elemental fluorine is by thermal decomposition of a fluorocarbon resin. The cleaned part has a surface layer free of oxides and depleted of aluminum and titanium. It is brazable.

4 Claims, No Drawings

METHOD FOR CLEANING METAL PARTS WITH ELEMENTAL FLUORINE

A non-exclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

The present invention relates to a method for cleaning unbrazable metal parts sufficiently to render them brazable and more particularly, to a method for treating damaged gamma prime hardened alloy parts so that the parts can be repaired by brazing.

Late model gas turbine engines (for example, those on the Boeing 747, the DC-10, and the Lockheed 1011) employ in their turbine sections nickel based alloys that are gamma prime hardened. Many other engines contain such materials, and the use of gamma prime hardened alloys will no doubt increase in the future due to the desirable properties of these super alloys.

The problem is that engine parts made of such alloys are very expensive and, at present, are not repairable when crack damaged due to metal fatigue. Attempts to weld repair such components results in post-weld cracking. Likewise, conventional brazing cannot be affected because nickel-base braze alloys will not run on the gamma prime hardened surfaces. Thus, although a molten brazing alloy under high vacuum might stick new gamma prime hardened parts together, it has not previously been possible to place brazing alloy inside cracks in damaged gamma prime hardened alloy parts.

A successful braze is manifest when braze material is placed at the source of a crack (say 0.001 inch wide and one-half inch long) and, at brazing temperature, not only melts and sticks to the parent material, but also runs into and fills the length of the crack. Apparently, in use a gamma prime hardened alloy becomes oxidized (and/or sulfuridized) to the extent that the aluminum, titanium and chromium oxides (or sulfides) which coat the surface of the part, including the surfaces of the crack, prevent successful repair by brazing.

Accordingly, it has been recognized that such parts must be cleaned if they are to be brazed. One suggestion is to use chromium fluoride ($CrF_3$) and hydrogen ($H_2$) to clean damaged parts of gamma prime hardened alloys prior to a braze repair. It is speculated that the following reaction mechanism takes place:

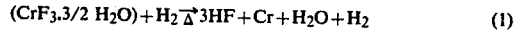

$$(CrF_3.3/2\ H_2O) + H_2 \rightleftarrows 3HF + Cr + H_2O + H_2 \quad (1)$$

$$MO_x + HF \rightarrow MF_x + H_2O + M \quad (2)$$

If, then, $MF_x$ is volatile at the reaction temperature, the oxide is effectively reduced and the base metal (M) should be brazable. However, uniform reproducibility of results is for some reason lacking and many parts cleaned by this process are still not brazable.

It is also known that stainless steel can be brazed in a stable reducing atmosphere of fluoride. In a paper presented by the Toulouse, France, Microturbo Company representatives at the American Welding Society (AWS) meeting in Philadelphia in April 1977, entitled "Brazing Stainless Steel in a Stable Reducing Atmosphere of Fluoride," there is described a brazing process carried out in a halogen atmosphere obtained by the decomposition of fluorine salts such as ammonium bifluoride acid and chromium fluoride. The proposed reactions are:

(1) $NH_4F.HF + Cr \rightleftarrows CrF_3 + NH_3 \uparrow + H_2 \uparrow$
(2) $NH_3 \rightarrow \frac{1}{2}N_2 + 3/2 H_2$ (on contact with metal)
(3) $CrF_3 + H_2 \uparrow \rightarrow 2HF \uparrow + Cr$
(4) $6HF + Cr_2O_3 \rightarrow 2CrF_3 + H_2O \uparrow + F_2 \uparrow$ There are two pertinent observations regarding these reactions: (a) the object would appear to be the production of HF gas which, in turn, does the cleaning, and (b) any elemental fluorine that forms is produced downstream of the work piece (see reaction 4). It is noted that in the presented paper there is an indication that "the technique cannot be used on assemblies of materials having a high level of electroposivity, such as titanium and ziroconium," and "it is essential to avoid the introduction of carbon into the furnace during brazing." There is no suggestion in the presented paper that this process could be used to braze gamma prime hardened alloys, let alone clean damaged parts of such alloys prior to brazing.

Accordingly, the need exists for an effective method for cleaning damaged parts of gamma prime hardened alloys in order to render them braze repairable.

SUMMARY OF THE INVENTION

That need is met by the present invention which utilizes a simple, inexpensive method for cleaning damaged gamma prime hardened alloy parts, the results of which have been found to be consistently reproducible. Those results are, in effect, what appears to be a denuding of the surface layer (10–25 microns deep) on the damaged part to substantially deplete that layer of aluminum and titanium metals and oxides (or sulfides) and also converting chromium oxides (or sulfides) to a reduced or more reducible form. This denuded surface, which extends into and along any cracks present, is brazable—the part is, therefore, braze repairable. There is little crack sensitivity in the braze repaired part once it has been re-heattreated to restore all the properties common to gamma prime hardened alloy parts.

The method by which these results are achieved involves the use of elemental fluorine gas at elevated temperatures (400° to 1200° C.) to clean the damaged gamma prime hardened alloy part. Preferably, a highly reducing carrier gas, such as hydrogen, is also used. The time of treatment may vary (the longer the treatment generally, the deeper the cleaning effect), but generally 30 to 60 minutes is sufficient to achieve a 10–25 micron deep denuded surface layer.

A convenient source of elemental fluorine has been found to be fluorocarbon resins, such as polytetrafluoroethylene or polymonochlorotrifluoroethylene, which release fluorine gas upon thermal decomposition. From the literature it is known that polytetrafluoroethylene resin liberates fluorine when heated to 350° C. or higher and the rate of evolution sharply increases between 400° and 450° C. Likewise, polymonochlorotrifluoroethylene resin liberates fluorine (and chlorine) at temperatures above 250° C. and the rate of evolution increases markedly above 300° C. See, Bureau of Mines Report of Investigations 4756, "Decomposition Temperatures of Polytetrafluoroethylene and Polymonochlorotrifluoroethylene as Indicated by Halogen Liberation, "united States Department of the Interior, December 1950. Other fluorocarbon resins which release fluorine gas on thermal decomposition may also be used, as can any other source of elemental fluorine.

At present nickel-based, gamma prime hardened alloys include INCO 713C, Mar M-200, Rene 80, Rene, 95, Rene 125, Rene 41, Udimet 500, and Udimet 520. These range from low (i.e., Rene 41 ) to medium (i.e., INCO 713C) to high (i.e., Rene 725) levels of gamma prime hardening. All levels may be cleaned, and rendered brazable at even commercial vacuums ($10^{-2}$ to $10^{-4}$ Torr) with the instant process. Similarly, the present process may be used to clean other types of unbrazable metal parts such as stainless steels to render them brazable; although, it finds its principal utility in the cleaning of damaged (particularly crack-damaged) gamma prime hardened alloy parts of the type mentioned.

This is because it is the only known process by which the oxides (or sulfides), including noble metal oxides, can with reproducible consistency be removed from the surface of damaged gamma prime hardened alloy parts and deplete their surfaces of aluminum and titanium. The cleaning allows nickel brazing and the aluminum and titanium depletion allows for wetting to fill cracks by the braze alloy.

Accordingly, it is an object of the present invention to provide a method for cleaning metal parts by use of elemental fluorine.

Another object of the present invention is to provide a method for cleaning damaged gamma prime hardened alloy parts to render them braze repairable.

Still another object of the invention is to provide brazable, cleaned metal parts.

Other objects and advantages of the present invention will be apparent from the following description and the appended claims.

DESCRIPTION OF THE PREFERRED EMBODIMENTS

As mentioned, a preferred embodiment of the present invention is to utilize a thermally decomposable fluorocarbon resin as a source of fluorine along with a hydrogen reducing atmosphere to clean unbrazable metal parts and render them brazable at commercial vacuum levels ($10^{-2}$ to $10^{-4}$ Torr). It has been found that when a fluorocarbon resin is decomposed adjacent the part in the absence of a reducing gas such as hydrogen (i.e., without a carrier gas at all or using an inert one such as argon), carbon forms on the part and prevents brazing. The reducing gas is apparently necessary to prevent carbon deposition; although, otherwise the part has the characteristics of parts cleaned by the preferred method, as will be discussed below.

Of course, when a non-carbonaceous source of elemental fluorine is used, no carbon is formed and hydrogen is not required. Thus, when pure fluorine gas is used as it may be in an alternative embodiment, there is no need to use a carrier gas, or an inert one can be used instead of hydrogen. Still, hydrogen can also be present. The following example is illustrative.

EXAMPLE

In this example, a three-zone tube furnace (approximately 5¾ inch diameter) was used. The ends of the tube furnace were hermetically sealed. At one end of the furnace a gas inlet port was located. This port was connected to a supply (bottle) of carrier gas such as argon or hydrogen. The supply of that gas was controlled by a valve arrangement. At the other end of the passage through the tube furnace there was located an outlet port through which the used gases exited. The tube outlet connected via a valve to the outlet port was directed into alkali (soda) containing water traps which themselves exhausted into an exhaust hood.

Into the first zone of the three-zone furnace there was placed a supply (approximately 50 grams) of polytetrafluoroethylene resin, namely, Teflon I from duPont de Nemours and various representative types of damaged gamma prime hardened alloy parts (INCO 713C) or pieces of unexposed gamma prime hardened alloy (INCO 713C and Rene 95) were placed in the second heating zone on a support grate. The outlet valve was closed and the furnace back-filled with argon gas from the inlet port.

The system was then heated to a part treatment temperature of approximately 950° C. in zone two and a resin decomposition temperature of approximately 650° C. in zone one. After initial warm-up, hydrogen gas is flowed through the passage at a rate of approximately 3 cubic feet per hour, while the temperatures are maintained. This flow was continued for approximately 60 minutes. All along the third zone is maintained as cool as possible (approximately 300° C.) to entrap monomer vapors on heat shields which were placed in the third zone for that purpose. Likewise, the outlet areas were cooled with cooling coils to room temperature or below. Following heating, the furnace was allowed to cool to 500° C. under moderate hydrogen gas flow and then with argon gas flow until the part could be removed.

An inspection of the parts reveals that there appears to be a denuded surface area of approximately 10-≃microns depth. The characteristic gamma prime hardened structure represented by the fine uniform grain formation at the base is not present on the surface, and instead it is replaced by a mocroporous (wormy) surface layer which follows the crack and is brazable. On microscopic inspection there was revealed crystalline agglomerations of the surface aluminum and chromium as compared to the base alloy. These agglomerations are also low in nickel content compared to the base alloy. This is as a direct consequence of the cleaning process described above.

As theorized above, it is believed that there has been a depletion of aluminum and titanium and a conversion of the chromium compounds to a brazable state. At any rate, it is clear that oxides and sulfides have been removed from the cleaned parts. The parts are bright and shiny after cleaning by this process.

Similar specimens of INCO 713C, Rene 95, and Rene 80 cleaned by this process were lap joint brazed. The brazing was successful. More significantly, cleaned INCO 713C parts which had seen previous service demonstrated successful braze run performance in both high and low vacuum; whereas, portions of the same part which had been pickled but not cleaned did not demonstrate such brazing performance. And, in fact, the pickled parts demonstrated non-brazability. Other specimens (INCO 713C, unexposed) were heated to a brazing temperature in a high vacuum with a small mound of Nicrobray 200 from Wall Colmonoy Corp. brazing alloy on top. The braze alloy was observed to both adhere and wet the cleaned surface.

As can be seen from the example, the method of the present invention enables one to clean and then braze repair what would otherwise be unbrazable parts. Repair of gamma prime hardened alloy parts is presently the goal of every high volume user of these alloys. Brazing is also by far the least expensive and most promising means of achieving this repair. The present invention provides a method for cleaning and the cleaned parts by which the repair can be done by brazing.

While the method and product produced by that method herein described constitute a preferred embodiment of the invention, it is to be understood that the invention is not limited to this precise method and product, and that changes may be made therein without departing from the scope of the invention which is defined in the appended claims.

What is claimed is:

1. A method for cleaning damaged gamma prime hardened alloy parts in order to render them repair brazable comprising: (a) placing the part in a hermetically sealed passage having inlet and outlet gas ports, (b) locating a fluorocarbon resin in said passage upstream of said part, (c) heating said fluorocarbon resin to above its decomposition temperature to release elemental fluorine, (d) introducing hydrogen gas through said inlet port and flowing it past said fluorocarbon resin and, then, past said part to carry the elemental fluorine through said passage and toward said outlet port and (e) collecting the gas exiting from said outlet port.

2. The method of claim 1 wherein said fluorocarbon resin is polytetrafluoroethylene resin.

3. The method of claim 2 wherein the collected gas exiting from said outlet port is treated to render it non-toxic.

4. The method of claim 3 wherein said polytetrafluoroethylene resin is heated to above 400° C. to release elemental fluorine, said part is at the same time heated to a treatment temperature of above 750° C.

* * * * *